(12) United States Patent
Baur et al.

(10) Patent No.: US 6,182,370 B1
(45) Date of Patent: Feb. 6, 2001

(54) MANUALLY OPERATED ANGLE PICKUP

(75) Inventors: Jan Baur, Leinfelden-Echterdingen; Walter Link, Rutesheim, both of (DE)

(73) Assignee: Euchner GmbH and Co., Leinfelden-Echterdingen (DE)

( * ) Notice: Under 35 U.S.C. 154(b), the term of this patent shall be extended for 0 days.

(21) Appl. No.: 09/180,950

(22) PCT Filed: Jun. 12, 1997

(86) PCT No.: PCT/EP97/03056

§ 371 Date: Nov. 18, 1998

§ 102(e) Date: Nov. 18, 1998

(87) PCT Pub. No.: WO98/01723

PCT Pub. Date: Jan. 15, 1998

(30) Foreign Application Priority Data

Jul. 5, 1996 (DE) .............................................. 196 27 089
Apr. 1, 1997 (DE) .............................................. 297 05 744

(51) Int. Cl.[7] ................. G01B 5/24; G01B 7/30
(52) U.S. Cl. ............... 33/1 PT; 33/1 N; 33/343; 33/345; 33/DIG. 1
(58) Field of Search .................... 33/1 N, 1 PT, 33/343, 344, 345, 355 R, 534, DIG. 1

(56) References Cited

U.S. PATENT DOCUMENTS

| 3,098,300 | * | 7/1963 | Zieher .................................. 33/1 N |
| 4,495,700 | * | 1/1985 | Ernst ..................................... 33/1 N |
| 4,970,423 |   | 11/1990 | Tamae et al. . |
| 5,263,258 | * | 11/1993 | Dobler et al. ......................... 33/1 N |
| 5,375,333 | * | 12/1994 | Hecht et al. .......................... 33/1 PT |
| 5,446,966 | * | 9/1995 | Ishizaki ................................. 33/1 PT |
| 5,657,544 | * | 8/1997 | Ota et al. .............................. 33/1 N |

FOREIGN PATENT DOCUMENTS

| 2855635 | * | 7/1980 | (DE) ..................................... 33/1 PT |
| 4311496 |   | 10/1994 | (DE) . |
| 4436724 |   | 4/1996 | (DE) . |
| 999972 |   | 7/1965 | (GB) . |
| 1325296 | * | 7/1987 | (SU) ..................................... 33/1 PT |

* cited by examiner

Primary Examiner—Diego Gutierrez
Assistant Examiner—Faye Francis
(74) Attorney, Agent, or Firm—Roylance, Abrams, Berdo & Goodman, L.L.P.

(57) ABSTRACT

A manually operated angle pickup or detector has a rotatably mounted and manually movable transmitter element, a sensor that scans the transmitter element and a detent coupling that operates magnetically and in a contactless manner to maintain the transmitter element in defined angular positions which can change from one to another by manual operation. The detent coupling includes at least one permanent magnet with poles disposed in the axial direction and two toothed disks provided on the side of at least one pole of the permanent magnet. The two toothed disks are radially spaced and have a corresponding number of teeth. The disks are interconnected by the magnetic flux and are of a material with good conductivity.

13 Claims, 3 Drawing Sheets

MANUALLY OPERATED ANGLE PICKUP

FIELD OF THE INVENTION

The present invention relates to a manually operated angle pickup or detector having a rotatably mounted and manually movable transmitter element, a sensor scanning the transmitter element and a magnetic coupling releasably holding the transmitter element in selected angular positions.

BACKGROUND OF THE INVENTION

In a known angle detector disclosed in DE 43 11 496 C2, the transmitter element is a disk. The disk exterior margin or border area is formed by tongues that are bent in such a manner that they engage along a part of their length in a cylindrical surface concentric to the rotary axis of the transmitter element. Concentric to this cylindrical surface and at quite a small radial spacing therefrom, north and south poles of a magnet associated with the second part of the detent mechanism are provided, one after the other in sequence around its periphery.

One disadvantage of that arrangement is that, with predetermined spacing and dimensions, it is of certain very small dimensions which are predetermined in absolute terms on the basis of the pole spacing required.

DE 44 36 724 A1 discloses another electronic position detector having a magnetic detent system in which the magnetic detent device includes at least three radially grooved magnet detent disks coaxial to one another and alternatively wave- and carrier-resistant. The disks are in turn radially grooved over the entire disk periphery.

One disadvantage of this construction is that the attraction force between the individual magnetic detent disks is decreased by axial displacement. Thus, only slight tolerances are acceptable in its manufacture.

SUMMARY OF THE INVENTION

Objects of the present invention are to provide a manually operated angle detector having a magnetic detent coupling for releasably holding its transmitter element in selected angular positions, while allowing a small structure, and relative to that small structure, allowing extensive built-in tolerances, without being negatively influenced in its operation.

The foregoing objects are basically attained by a manually operated angle detector, comprising a rotatably mounted and manually movable transmitter element, a sensor scanning the transmitter element, and a magnetic detent coupling releasably holding the transmitter element in selected angular positions after being manually moved between selected ones of the angular positions. The detent coupling includes at least one permanent magnet and first and second toothed disks of material that conducts magnetic flux. The permanent magnet has first and second poles arranged in axial alignment. The first toothed disk is on a side of the permanent magnet adjacent the first pole and has a number of teeth. The second toothed disk has the same number of teeth and is radially spaced from the first toothed disk. The first and second toothed disks are coupled by magnetic flux.

The axial arrangement of the north and south poles facilitates miniaturization, especially in its radial direction. Thus, the diameter of the angle detector is independent of the very slight distances between the poles.

It is especially cost-saving to use one single permanent magnet. No mounting or assembly error or deviation because of incorrect construction can then occur with this configuration.

Sprocket wheels or toothed disks are especially suitable for miniaturization, and can be arranged on both sides of the permanent magnet. Such disks are connected with one another by a tube. Thus, the toothed disks, the corresponding disks and their connection element are of a material which is a good conductor of the magnetic flux. As a result of the differing contours of the teeth, the air gap between toothed disks and corresponding disks varies. The magnetic flux, and thus, the attraction of the teeth of the toothed disks and corresponding disks is at the greatest when the teeth lie directly opposite one another.

Both poles can be connected with one single toothed disk, whereby the corresponding disks are arranged at some radial spacing therefrom. However it is also possible that only one of the two poles is connected with a toothed disk, and only one corresponding disk is provided at some radial distance therefrom. Opposite the other pole and at some axial distance therefrom, a toothless disk is arranged, which toothless disk remains in magnetically conductive connection through a connection element. The toothless disk can be a separate structural part or can be constructed integral with the connection element as some sort of cup of one piece.

The quantity of one hundred teeth facilitates especially good manipulation of the angle detector for rapid and precise adjustment or input, for example of coordinates in the case of computerized numerical control (CNC). Other preferred numbers of teeth are sixteen, thirty-two, fifty or sixty, but the number of teeth should lie in the range of ten to one hundred sixty, to guarantee good manipulation and handling.

The angle detector is especially compact when the detent mechanism is provided directly in the adjustment or presetting disk.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
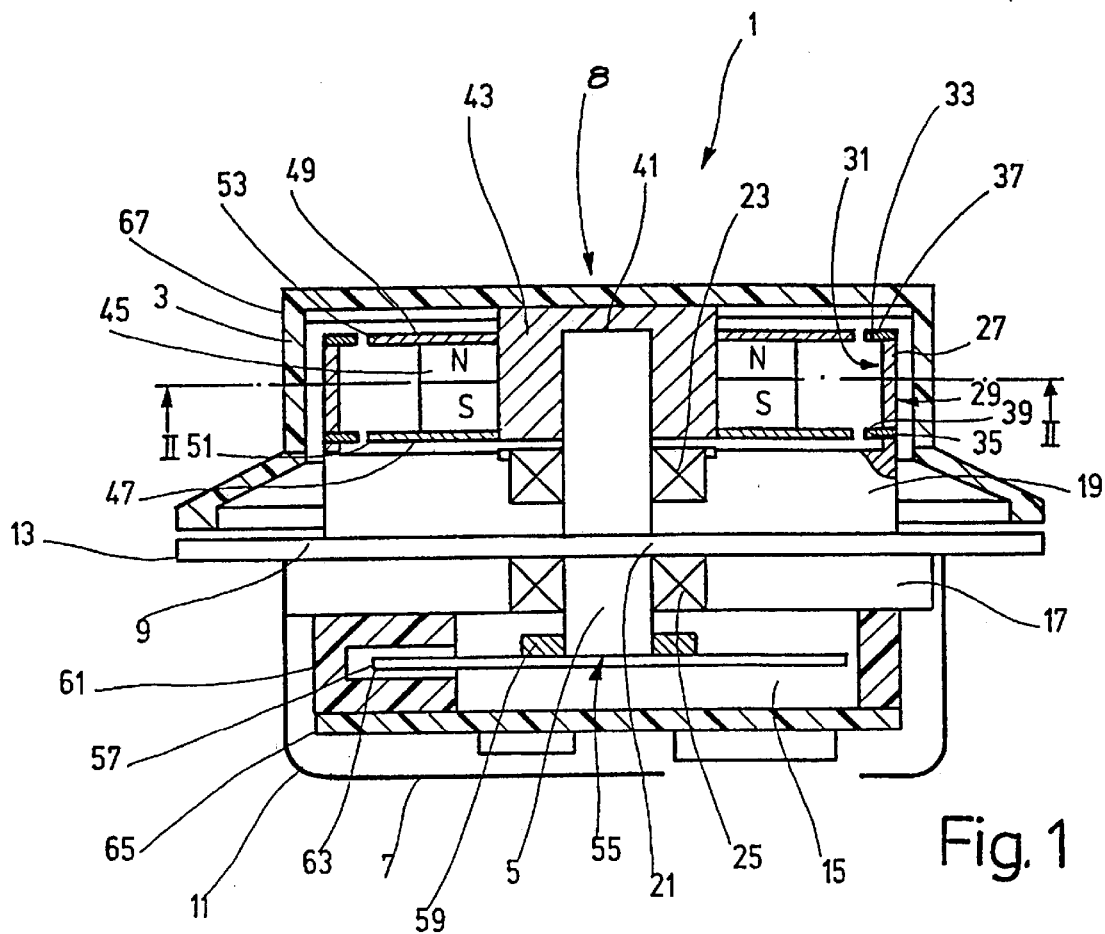
FIG. 1 is a side elevational view in section of a manually operated angle detector according to a first embodiment of the present invention.

FIG. 1 shows a manually operated angle detector 1 with an adjustment or presetting disk or adjusting wheel 3. Adjusting wheel 3 is introduced from the exterior by means of a shaft 5, and is mounted in a housing 7. Altogether, the rotatably mounted parts rotated by means of shaft 5 are indicated in their entirety as transmitter element 8. Housing 7 has a housing cover 9 and a cup-shaped bottom portion 11. Housing cover 9 projects with formation of an axially symmetric flange 13 to the side, outwardly over bottom part 11. With the aid of flange 13, angle detector 1 can, for example, be mounted in a panel, switchboard or keyboard.

Within housing interior chamber 15, housing cover 9 has a discoid or plate-like reinforcement 17. The exterior contour of reinforcement 17 corresponds essentially to the configuration of the opening of bottom part 11. On its other side, housing cover 9 has another discoid or plate-shaped reinforcement 19. In the middle of housing cover 9, a perpendicular passage borehole 21 extends through the reinforcements 17 and 19. Shaft 5 is mounted in borehole 21 and is retained radially and axially by means of bearings 23 and 25.

The exterior 29 of a tube 27 forms a cylindrical extension of the exterior contour of reinforcement 19. On the interior 31 of tube 27, two disks 33 and 35 are arranged at some axial distance from one another with corresponding interior teeth 37 and 39 without angular displacement.

On the end 41 of shaft 5 projecting out of housing 7, an axially symmetrical part 43 is mounted, for example, by shrinking on or gluing on. At its periphery, part 43 supports a permanent magnet 45 and two identical toothed disks 47 and 49 with exterior toothing/sprocket arrangements or teeth 51 and 53. The first toothed disk 47 is arranged on the permanent magnet side turned toward or adjacent housing 7. The second toothed disk 49 is arranged on the side of permanent magnet 45 turned away or remote from housing 7, without angle displacement relative to first toothed disk 47. The degree of spacing between the two toothed disks 47 and 49 corresponds to the thickness of permanent magnet 45 and also determines the degree of spacing between the two toothed disks 33 and 35, which in turn are arranged concentrically around the toothed disks 47 and 49. Between the crown line of the interior toothing/sprocket arrangements 37, 39 of disks 33, 35 and the exterior toothing/sprocket arrangements 51, 53 of toothed disks 47, 49 in turn exists a small radial spacing.

Figure 2:
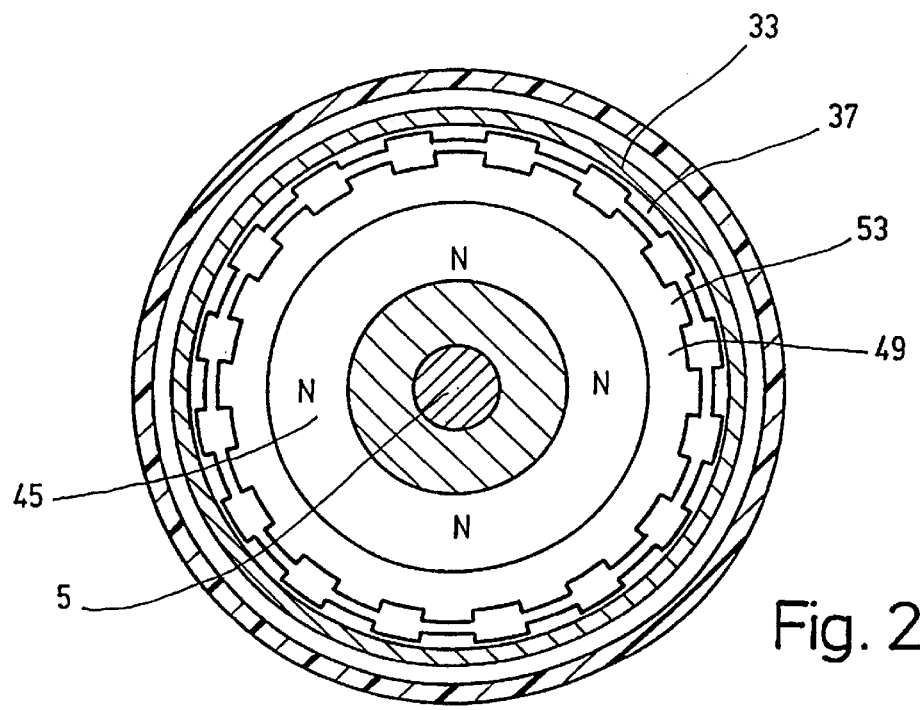
FIG. 2 is a bottom plan view in section of the angle detector taken along line II—II of FIG. 1.

The number of teeth on toothed disks 47 and 49 corresponds to the number of teeth present on the interior toothing/sprocket arrangements 37 and 39 of disks 33 and 35. Thus, the number of teeth of toothed disks 47 and 49 and disks 33 and 35 can be selected as desired, but having the number of teeth being one hundred is especially desirable. For simplified illustration, only 16 teeth are shown in FIG. 2.

Toothed disks 47 and 49, disks 33 and 35 and tube 27 are formed of a material which is a good conductor of the magnetic flux from the permanent magnet 45.

Permanent magnet 45 together with toothed disks 47 and 49, disks 33 and 35 and tube 27 form a detent mechanism. Thus, permanent magnet 45 along with toothed disks 47 and 49 represent a sort of horseshoe magnet, and disks 33 and 35 with tube 27 represent a sort of magnet yoke. The magnetic flux is attracted proportionally more strongly the smaller the degree of radial spacing (i.e., the dimensions of the air gap between disk 33 and toothed disk 47 and/or between disk 35 and toothed disk 49). This radial spacing is the smallest when the teeth of disks 33, 35 and toothed disks 47, 49, respectively, lie directly opposite one another. Because of the plurality of magnetic circuits, corresponding to the number of teeth of disks 33, 35 and toothed disks 47, 49, the attraction force between the entirety of the horseshoe magnets and the magnet yoke in the setting shown in FIG. 2 is relatively strong, causing a high degree of attraction, even when the detent factor of the individual magnetic circuits is low.

At the end 55 of shaft 5 located in the interior chamber 15 of the housing, a round code disk 57 is mounted. For enlargement of the contact surface between code disk 57 and shaft 5, a ring 59 is arranged at end 55 concentric to shaft 5. The ring, together with end 55, forms a flat surface on its side turned toward code disk 57.

On reinforcement 17 in housing interior chamber 15 a bifurcated bracket 61 with a cutout 63 is mounted. The margin of code disk 57 projects into this cutout 63. A light enclosure can be provided in bracket 61 to serve as a sensor which produces a pulse-like signal with each rotation of shaft 5 into each subsequent detent position. When the sensor produces a pulse-like signal, angle detector 1 can also be used as incremental position detector and transmitter. On the bottom of bracket 61 a conductor plate 65 is arranged. Plate 65, by means of an inserted chip, may convert the measurement results of the scanning, and thus, determine a corresponding angle setting of toothed disks 47 and 49 relative to stationary disks 33 and 35. Alternatively, the scanning signals could be conducted further to an external evaluation arrangement.

The parts projecting out of housing 7 are covered by means of a hood-like part 67 of the setting or adjusting wheel 3 mounted on the side of the part 43 exterior to housing 7. This hood-like part 67 simultaneously controls the rotation of the parts connected with the shaft, and along with that, the manual position setting.

Figure 3:
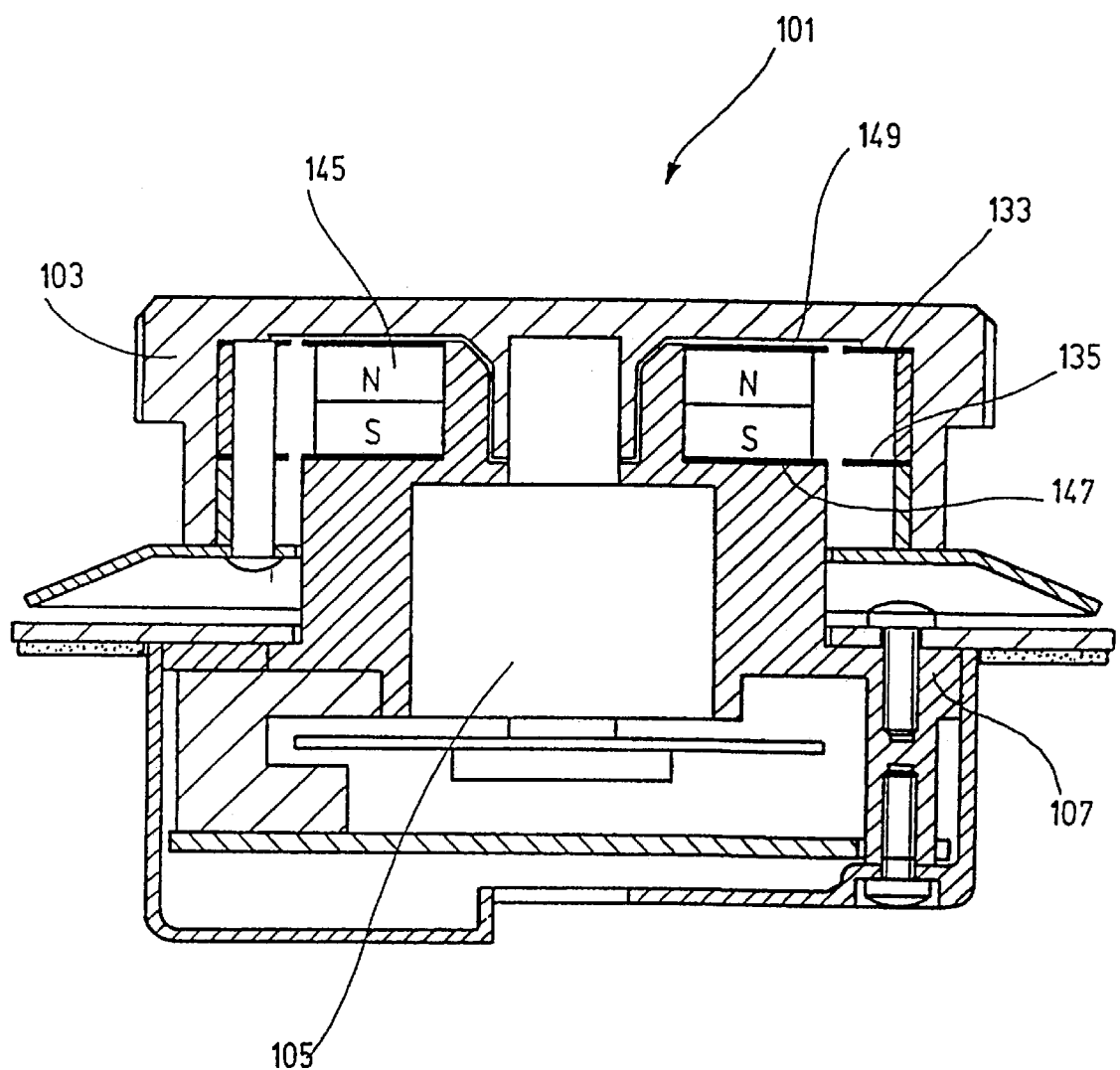
FIG. 3 is a side elevational view in section of a manually operated angle detector according to a second embodiment of the present invention.

FIG. 3 shows a second manually operated angle detector 101, having a construction essentially identical with that of the first embodiment. The difference between the first and second embodiments resides in that the permanent magnet 145 is connected not with the shaft 105, but rather is connected with the housing 107. Also, the toothed disks 147 and 149 are stationary, whereas the disks 133 and 135 are connected with the adjustment or presetting wheel 103. The detent mechanism operates as in the first embodiment. However, the moving and stationary parts are interchanged.

Figure 4:
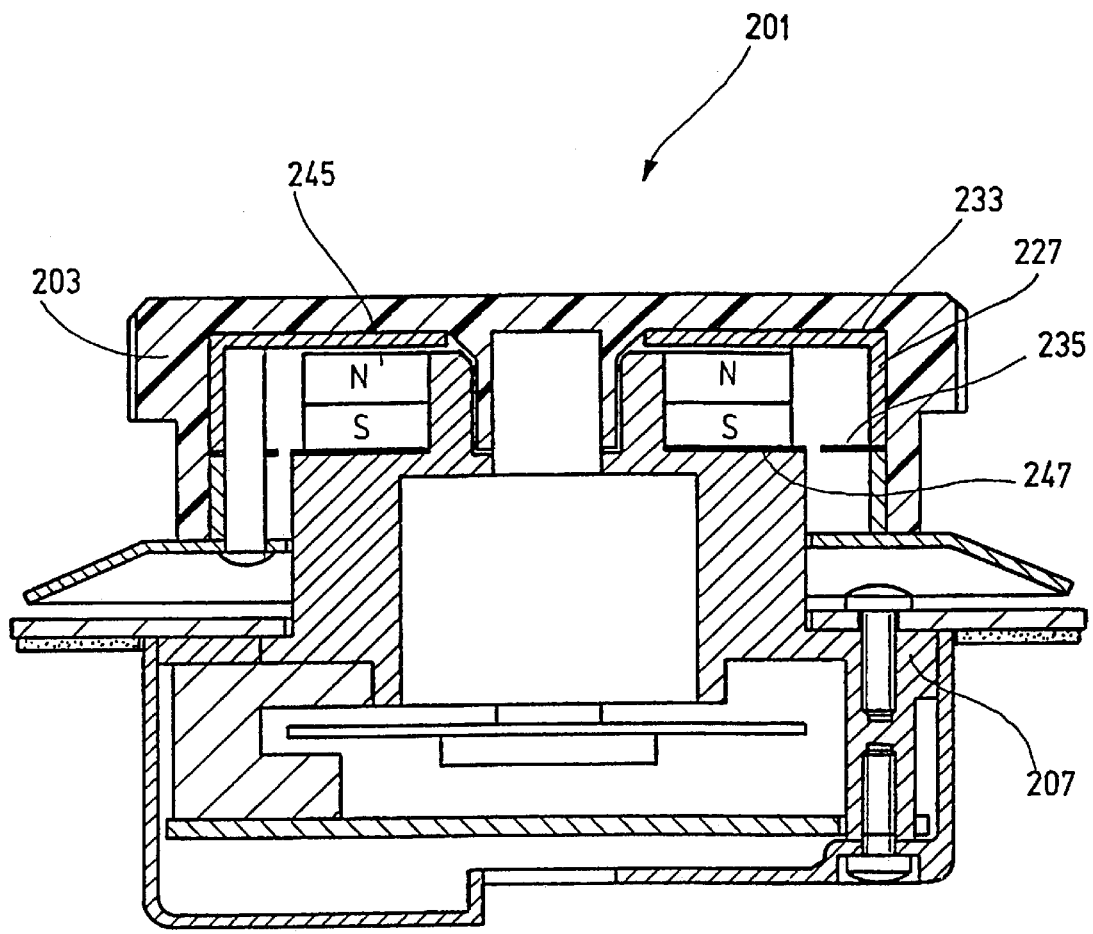
FIG. 4 is a side elevational view in section of a manually operate angle detector according to a third embodiment of the present invention.

The third embodiment of an angle detector 201, illustrated in FIG. 4, is essentially identical with the first and second embodiments. The permanent magnet 245 is connected with the housing 207, and is connected at the south pole with a toothed disk 247. This toothed disk 247 is arranged at some radial distance from a corresponding disk 235 with a corresponding number of teeth, that in turn is connected with the adjustment or presetting disk 203. Opposite the north pole a toothless disk 233 is arranged with some axial spacing. Toothless disk 233 is connected through a tubular connection element 227 with the disk 235 corresponding to toothed disk 247 in magnetically conductive connection, whereupon the magnetic flux is closed. Toothless disks 233 and tubular connection element 227 are constructed of one piece in this embodiment, and thus, have the form of a cap.

The angle setting can be scanned by means of a modified arrangement of the embodiment exterior to housing 7 or 107 and within the hood-like part 67. One of the toothed disks 47, 49 or disks 133, 135, 235 can be used for this purpose.

While various embodiments have been chosen to illustrate the invention, it will be understood by those skilled in the art that various changes and modifications can be made therein without departing from the scope of the invention as defined in the appended claims.

What is claimed is:

1. A manually operated angle detector, comprising:
   a rotationally mounted and manually movable transmitter element;
   a sensor scanning said transmitter element; and
   a magnetic detent coupling releasably holding said transmitter element in selected angular positions after being manually moved between selected ones of said angular positions, said detent coupling including at least one permanent magnet and first and second toothed disks of material that conducts magnetic flux, said permanent magnet having first and second poles arranged in axial alignment, said first toothed disk being on a side of said permanent magnet adjacent to said first pole and having a number of teeth, said second toothed disk having said number of teeth and being radially spaced from said first toothed disk;

whereby said first and second toothed disks are coupled by magnetic flux.

2. A manually operated angle detector according to claim 1 wherein
- a third toothed disk having said number of teeth is provided on a side of said permanent magnet adjacent said second pole; and
- a fourth toothed disk having said number of teeth is radially spaced from said third toothed disk.

3. A manually operated angle detector according to claim 2 wherein
- said first and second toothed disks are substantially coplanar and concentric; and
- said third and fourth toothed disks are substantially coplanar and concentric.

4. A manually operated angle detector according to claim 3 wherein
- said teeth of said first and second toothed disks extend radially therefrom and toward one another at a closest point thereof; and
- said teeth of said third and fourth toothed disks extend radially therefrom and toward one another at a closest point thereof.

5. A manually operated angle detector according to claim 1 wherein
- a conductor disk is provided adjacent to and axially spaced from said second pole of said permanent magnet, said conductor disk being conductively coupled to said second toothed disk.

6. A manually operated angle detector according to claim 1 wherein
- said number of teeth is equal to or greater than ten and is equal to or less than one hundred sixty.

7. A manually operated angle detector according to claim 1 wherein
- said detent coupling is housed in a manually operated adjustment wheel.

8. A manually operated angle detector according to claim 1 wherein
- at least a part of said transmitter element is in a housing.

9. A manually operated angle detector according to claim 8 wherein
- said housing comprises an interior chamber containing a code disk that forms a component of said transmitter element, said code disk being scanned by said sensor.

10. A manually operated angle detector according to claim 1 wherein
- said permanent magnet is a component part of said transmitter element.

11. A manually operated angle detector according to claim 8 wherein
- said permanent magnet is fixedly connected with said housing.

12. A manually operated angle detector according to claim 1 wherein
- said first and second toothed disks are substantially coplanar and concentric.

13. A manually operated angle detector according to claim 12 wherein
- said teeth of said first and second toothed disks extend radially therefrom and toward one another at a closest point thereof.

* * * * *